(12) United States Patent
Johnson

(10) Patent No.: US 8,420,217 B2
(45) Date of Patent: Apr. 16, 2013

(54) ELASTIC BONDING FILMS

(75) Inventor: Michael A. Johnson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 268 days.

(21) Appl. No.: 13/055,724

(22) PCT Filed: Jun. 30, 2009

(86) PCT No.: PCT/US2009/049242
§ 371 (c)(1),
(2), (4) Date: Jan. 25, 2011

(87) PCT Pub. No.: WO2010/011474
PCT Pub. Date: Jan. 28, 2010

(65) Prior Publication Data
US 2011/0123786 A1   May 26, 2011

Related U.S. Application Data

(60) Provisional application No. 61/083,664, filed on Jul. 25, 2008.

(51) Int. Cl.
*B32B 27/40* (2006.01)
(52) U.S. Cl.
USPC .............. 428/423.1; 428/423.3; 428/343; 428/346

(58) Field of Classification Search ............... 428/423.3, 428/343, 346, 423.1
See application file for complete search history.

(56) References Cited

U.S. PATENT DOCUMENTS

| 4,652,494 | A | | 3/1987 | Bravet |
| 5,340,901 | A | * | 8/1994 | Wang ............. 528/60 |
| 5,354,609 | A | * | 10/1994 | Wang .......... 428/317.5 |
| 2011/0045306 | A1 | * | 2/2011 | Johnson et al. ....... 428/423.1 |

FOREIGN PATENT DOCUMENTS

| EP | 0629721 | 12/1994 |
| WO | WO 2007/068599 | 6/2007 |

OTHER PUBLICATIONS

ASTM Designation: D412-06a$^{\varepsilon 2}$, Standard Test Methods for Vulcanized Rubber and Thermoplastic Elastomers-Tension, 2006, 14 pages.
ASTM Designation: D1876-08, Standard Test Method for Peel Resistance of Adhesives (T-Peel Test), 2008, 3 pages.
International Search Report for PCT/US2009/049242, 3 pages.

* cited by examiner

*Primary Examiner* — Thao T. Tran
(74) *Attorney, Agent, or Firm* — Dena M. Ehrich

(57) ABSTRACT

Elastic bonding films that include an elastic, thermoset core layer and a thermoplastic bonding layer on each side of the core layer are described. The thermoset core layer is a polyurethane formed as the reaction product of (i) a multifunctional isocyanate with (ii) a combination of polyols comprising (a) polyester diol, (b) crosslinker, and (c) hard segment. Articles incorporating such elastic bonding films including fabrics bonded to such films are also described.

19 Claims, 1 Drawing Sheet

ELASTIC BONDING FILMS

CROSS REFERENCE TO RELATED APPLICATIONS

This application is a national stage filing under 35 U.S.C. 371 of PCT/US2009/049242, filed Jun. 30, 2009, which claims priority to U.S. Provisional Application No. 61/083,664, filed Jul. 25, 2008, the disclosure of which is incorporated by reference in its/their entirety herein.

FIELD

The present disclosure relates to elastic bonding films. The bonding films include an elastic, thermoset core layer and a thermoplastic bonding layer on at least one side of the core layer. The thermoset core layer is a polyurethane formed as the reaction product of (i) a multifunctional isocyanate with (ii) a combination of polyols comprising (a) polyester diol, (b) crosslinker, and (c) hard segment. The present disclosure also relates to articles incorporating such elastic bonding films including fabrics bonded to such films.

SUMMARY

Briefly, in one aspect, the present disclosure provides an elastic bonding film comprising an elastic core layer bonded to at least one thermoplastic bonding layer. The core layer comprises the cured reaction product of a composition comprising a multifunctional isocyanate and a combination of polyols. The combination of polyols includes x mole fraction of equivalents of (a) polyester diol, wherein x is between 0.25 and 0.6, inclusive; y mole fraction of equivalents of (b) crosslinker, wherein y is between 0.15 and 0.4, inclusive; and z mole fraction of equivalents of (c) hard segment; wherein z is between 0.2 and 0.45, inclusive; wherein the sum of x, y, and z is 1.

In some embodiments, the system functionality of the composition is at least 2.05. In some embodiments, the ratio of isocyanate groups to hydroxyl groups in the combination of polyols is at least 1.05.

In some embodiments, the mole fraction of equivalents of polyester diol, crosslinker, and hard segment are selected such that SRC is less than 30, wherein SRC=72 x+2378 y+967 z−4062 x·y+247 x·z−6445 y·z.

In some embodiments, the mole fraction of equivalents of polyester diol, crosslinker, and hard segment are selected such that ELC is between 500 and 2500 kPa; wherein: ELC=4102 x+25,628 y+75,297 z+44,876 x·y−148,769 x·z−199,804 y·z.

In some embodiments, the mole fraction of equivalents of polyester diol, crosslinker, and hard segment are selected such that SLC is between 500 and 2500 kPa; wherein: SLC=10,203 x+66,635 y+109,567 z−7632 x·y−194,384 x·z−345,379 y·z.

In some embodiments, the mole fraction of equivalents of polyester diol, x, is between 0.25 and 0.35, inclusive. In some embodiments, the mole fraction of equivalents of crosslinker, y, is between 0.3 and 0.4, inclusive. In some embodiments, the mole fraction of equivalents of hard segment, z, is between 0.35 and 0.45.

In some embodiments, the polyester diol is a five carbon dibasic acid polyester polyol. In some embodiments, the crosslinker is a triol, e.g., a glycerol. In some embodiments, the hard segment is an alkyldiol. In some embodiments, the alkyl group of the alkyldiol contains 2 to 6 carbon atoms.

In some embodiments, the thermoplastic layer comprises a urethane. In some embodiments, the thermoplastic layer is a pressure sensitive adhesive. In some embodiments, the thermoplastic layer is a heat-activated adhesive. In some embodiments, the elastic bonding film further comprising a second thermoplastic layer bonded to the elastic core layer.

In another aspect, the present disclosure provides an article comprising a fabric and the elastic bonding film, wherein the thermoplastic layer of the elastic bonding film is bonded to the fabric. In some embodiments, the fabric has a stress relaxation, SRF, as measured according to the "Stress Relaxation Test Method" and the mole fraction of equivalents of polyester diol, crosslinker, and hard segment are selected such that SRC is less than 1.2 SRF, wherein SRC=72 x+2378 y+967 z−4062 x·y+247 x·z−6445 y·z. In some embodiments, the mole fraction of equivalents of polyester diol, crosslinker, and hard segment are selected such that SRC is between 0.8 SRF and 1.1 SRF.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
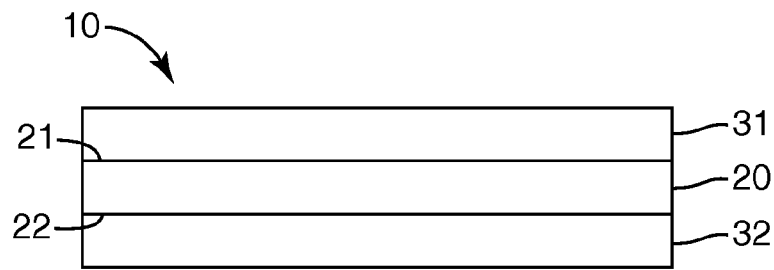
FIG. 1 illustrates an exemplary bonding film according to some embodiments of the present disclosure.

As used herein, all percentages are by mole unless otherwise indicated. As used herein, all ranges are inclusive, i.e., all ranges include the end points of the range. E.g., the phrase "between 1 and 10" includes the values 1 and 10, as well as all values between these end points.

Advances in the garment industry are creating opportunities to identify new and useful materials to improve clothing and address long-felt needs in the industry. For example, fabric attachment and clothing construction has traditionally been accomplished through sewing operations. Recently, some clothing manufacturers have used heat-activated adhesive films such as thermoplastic polyurethanes to bond fabrics together thereby improving the appearance and feel of the garment.

Fabrics themselves have evolved to provide greater durability and performance, and enable new design options. For example, elastic fabrics have been used to produce form-fitting garments including, e.g., undergarments. Typical fabrics used in these applications exhibit approximately 25 percent stress relaxation when strained at 30 percent. The primary reason to minimize stress relaxation is to avoid having the garments feel as though they are becoming loose when worn.

Traditionally, shirrs have been sewn into a garment to improve the fit and to allow a single garment size to accommodate some range of sizes; thus, reducing the need to manufacture numerous intermediate garment sizes. Elastic films have also been attached, e.g., sewn, to the fabric to accomplish these objectives. Materials used to produce these elastic films, such as most thermoplastic polyurethane films, exhibit 40 to 50 percent stress relaxation when strained at 30 percent, which is significantly greater than the approximately 25 percent stress relaxation typical of the fabrics themselves.

Generally, the present disclosure provides a multilayer elastic bonding film comprising a thermoset core layer and at least one thermoplastic bonding layer. In some embodiments, the elastic properties of the bonding film are controlled by the properties of the core layer, while the bonding properties of the film can be independently adjusted by modifying the thermoplastic bonding layer. The core layer also prevents the thermoplastic bonding layer from "squeezing-out" during the bonding process. Squeeze-out can occur with conventional thermoplastic adhesive bonding films when the molten adhesive is either heated to too high of a temperature, which results in an excessive reduction in the viscosity of the adhesive, or through the application of too much pressure during the bonding process. The crosslinked nature of the core layer prevents squeeze-out and affords more control of the bonding process by controlling the geometry of the bond line.

The thermoset core layers of the present disclosure comprise a polyurethane formed as the reaction product of (i) a multifunctional isocyanate with (ii) a combination of polyols comprising (a) polyester diol, (b) crosslinker, and (c) hard segment.

Generally, any multifunctional isocyanate (e.g., diisocyanate) may be used including aromatic and aliphatic isocyanates. Exemplary aromatic isocyanates include toluene diisocyanate (TDI) and diphenylmethane diisocyanate (MDI), as well as their oligomeric forms which provide functionalities of three or more. Exemplary aliphatic isocyanates include 1,6-hexamethylene diisocyanate (HDI), and isophorone diisocyanate (IPDI), as well as their oligomeric forms.

Exemplary polyester polyols include five carbon dibasic acid liquid polyester polyols such as those available under the trade names "UrethHALL" from HallStar Company, Chicago, Ill., and "PRIPLAST" from Uniqema, New Castle, Del.; and polytetramethylene ether glycol based polyols, such as those available under the trade name of "polyTHF" from BASF Company, Florham Park, N.J. In addition, polycaprolactone based polyols, such as those available from Perstorp Polyols Inc., are available in a wide variety of functionalities and molecular weights and afford a great deal of latitude in formulating crosslinked polyurethane compositions. For ease of handling, polyols that are liquid at room temperature may be preferred; however, polyols that are solid at room temperature are also useful, particularly if exposed to heat sufficient to melt them prior to processing. In some embodiments, a combination of polyester polyols may be used.

As used herein "moles of equivalents" refers to the moles of functional groups. Thus, for a polyol it is the moles of equivalents of hydroxyl groups (OH), and for an isocyanate it is the moles of isocyanate groups (NCO). For example, for a diol or diisocyanate, the moles of equivalents would equal two times the moles of the diol or the diisocyanate, respectively. Similarly, for a triol, the moles of equivalents would equal three times the moles of the triol.

"Mole fraction of equivalents" for a particular polyol is the ratio of moles of equivalents of that particular polyol divided by the moles of equivalents for all polyols in the combination of polyols. Based on this definition, the sum of the mole fraction of equivalents for all polyols in the combination is 1.

In some embodiments, the combination of polyols comprises between 0.25 and 0.60 mole fraction of equivalents of polyester diol based on the total number of moles of equivalents of (a) polyester diol, (b) crosslinker, and (c) hard segment. In some embodiments, the combination of polyols comprises no greater than 0.40, e.g., no greater than 0.35 mole fraction of equivalents of polyester diol.

The crosslinker has a functionality greater than 2.0, e.g., a functionality of at least 3. In some embodiments, the crosslinker may have a higher functionality, e.g., 4. In some embodiments, the crosslinker is a low molecular weight triol, e.g., glycerol (i.e., propane-1,2,3-triol). Other exemplary crosslinkers include trimethylolpropane, 1,2,6-hexanetriol, and triethanol amine. In some embodiments, a combination of crosslinkers may be used.

In some embodiments, the combination of polyols comprises between 0.14 and 0.40 mole fraction of equivalents of the crosslinker based on the total number of moles of equivalents of (a) polyester diol, (b) crosslinker, and (c) hard segment. In some embodiments, the combination of polyols comprises at least 0.2, e.g., at least 0.3 mole fraction of equivalents of crosslinker.

Generally, a "hard segment" is a low molecular weight difunctional material, e.g., a low molecular weight alkyl diol. In some embodiments, the molecular weight of a hard segment is no greater than 250 gm/mole, in some embodiments, no greater than 150 gm/mole, or even no greater than 100 gm/mole. In some embodiments, a hard segment comprises an alkyl diol, wherein the alkyl group contains 2 to 6 carbon atoms, e.g., 2-4 carbon atoms. In some embodiments, a hard segment is 1,4-butane diol. Other exemplary hard segments include ethylene glycol (including di- and higher order ethylene glycols), propylene glycol (including di- and higher order propylene glycols), 1,3-propanediol, 1,3 butanediol, neopentyl glycol, 1,6-hexanediol, ethanolamine, diethanolamine, methyldiethanolamine, and phenyldiethanolamine. In some embodiments, a combination of hard segments may be used.

In some embodiments, the combination of polyols comprises between 0.19 and 0.45 mole fraction of equivalents of hard segment based on the total number of moles of equivalents of the (a) polyester diol, (b) crosslinker, and (c) hard segment. In some embodiments, the combination of polyols comprises at least 0.25, e.g., at least 0.35 mole fraction of equivalents of hard segment.

The "System Functionality" is defined as the total moles of equivalents of both hydroxyl and isocyanate groups divided by the total moles of the polyols and the multifunctional isocyanates. In order to obtain a crosslinked, thermosetting system the system functionality should be greater than 2. If the system functionality is 2 or less, little or no crosslinking is achieved and the material is typically thermoplastic. In some embodiments, the system functionality is greater than 2, in some embodiments, at least 2.05, or even at least 2.1. Typically, a higher system functionality leads to greater crosslinking and a stiffer system. In order to achieve a desired elastic behavior, in some embodiments, the system functionality is no greater than 2.2, and in some embodiments, no greater than 2.15. In some embodiments, the system functionality is between 2.05 and 2.2, inclusive, and in some embodiments, between 2.1 and 2.15, inclusive.

Generally, the ratio of the moles of equivalents of isocyanate groups over the moles of equivalents of hydroxy groups (NCO/OH) should be approximately 1, e.g., between 0.8 and 1.2, inclusive, and in some embodiments between 0.9 and 1.1, inclusive. If NCO/OH ratio is greater than 1, the crosslink density will increase, leading to higher hardness and lower elongation. If NCO/OH ratio is less than 1, the system will have a lower crosslink density, leading to softer system and greater elongation. Thus, the exact ratio of NCO/OH can be adjusted to obtain desired mechanical properties. In addition, decreasing the NCO/OH ratio tends to make the system more hydrophilic and will typically have greater moisture vapor transmission, which may be desirable in application benefiting from a "breathable" structure.

In some embodiments, it may be desirable to use an NCO/OH ratio of greater than 1 to ensure complete crosslinking. For example, the polyols are typically hygroscopic and may carry water into the system. This water tends to react quickly with available NCO sites making them unavailable for crosslinking with the hydroxy groups of the polyols. In some embodiments, an NCO/OH ratio of at least 1.02, (e.g., between 1.02 and 1.07, inclusive) and in some embodiments, at least 1.04 (e.g., between 1.04 and 1.06, inclusive) may be used.

EXAMPLES

Exemplary elastic core layers were prepared using the materials summarized in Table 1. The functionality (Fn.) of the materials is the number of moles of equivalents per mole of material, i.e., the number of moles of hydroxyl groups per mole of the material. The molecular weight (MW) is reported in grams/mole. The equivalent weight (EW), equal to the MW divided by the functionality, is reported in grams/mole of equivalents.

TABLE 1

Materials used in the preparation of exemplary elastic core layers.

| Material | Description | Fn. | MW | EW | Source |
|---|---|---|---|---|---|
| URETHALL 4050-55 | polyester polyol | 2 | 2040 | 1020 | HallStar |
| PRIPLAST 3192 | polyester polyol | 2 | 2000 | 1000 | Uniqema |
| BDO | 1,4 butanediol (hard segment) | 2 | 90 | 45 | |
| glycerol | propane-1,2,3-triol (crosslinker) | 3 | 92.1 | 30.7 | Sigma-Aldrich |
| DESMODUR I | isophorone diisocyanate (IPDI) | 2 | 222 | 111 | Bayer |
| MONDUR ML | 4,4' and 2,4' diphenylmethane diisocyanate (MDI) | 2 | 250 | 125 | Bayer |
| DABCO T-12 | Dibutyltindilaurate (catalyst) | — | — | — | Air Products |

General Procedure for Preparing a Urethane Layer.

General Compounding Procedure. The elastic polyurethane layers were prepared as follows. First, the desired amounts of polyester polyol, hard segment, crosslinker, and catalyst were weighed into a MAX 40 polypropylene mixing cup (available from Flacktec Inc., Landrum, S.C.). The filled cup was then inserted into a SPEEDMIXER DAC 150 FV high speed mixer (available from Flacktec Inc.), and mixed for 15 seconds at 3450 rpm. The isocyanate was then added to mixing cup and the mixture was mixed for an additional 15 seconds at 3450 rpm.

General Coating Procedure. Free films of the elastic polyurethane layer were formed by depositing the mixed solution between silicone coated polyester release liners positioned above and below the coating solution. The resulting three-layer construction was pulled though a knife coating apparatus with the gap between the knife and the coating bed set at approximately 50.8 microns.

Data Set A. Samples of an elastic urethane layer were prepared according to the General Procedure for Preparing a Urethane Layer. The compositions used for Data Set A are summarized in Table 2A. The amounts of each component are recorded both in grams (gm) and millimoles of equivalents (mMol Eq.). In addition to the components listed in Table 2A, one drop of DABCO T-12 catalyst was added to each composition. Additional details regarding the examples of Data Set A are provided in Table 2B including the mole fraction of equivalents of each polyol, the system functionality (Syst. Func.) and the NCO/OH ratio.

TABLE 2A

Compositions of the urethane elastic layers of Data Set A.

| Ex | URETHHALL 4050-55 gm | URETHHALL 4050-55 mMol Eq. | BDO gm | BDO mMol Eq. | glycerol gm | glycerol mMol Eq. | MONDUR ML gm | MONDUR ML mMol Eq. |
|---|---|---|---|---|---|---|---|---|
| A1 | 9.33 | 9.15 | 0.41 | 9.11 | 0.14 | 4.56 | 3 | 24 |
| A2 | 8.16 | 8.00 | 0.36 | 8.00 | 0.21 | 6.84 | 3 | 24 |
| A3 | 14.0 | 13.7 | 0.31 | 4.67 | 0.14 | 4.56 | 3 | 24 |
| A4 | 12.2 | 12.0 | 0.18 | 4.00 | 0.21 | 6.84 | 3 | 24 |
| A5 | 11.7 | 11.4 | 0.26 | 5.78 | 0.18 | 5.86 | 3 | 24 |

TABLE 2B

Compositions of the urethane elastic layers of Data Set A.

| | Mole fraction of equivalents | | | | |
|---|---|---|---|---|---|
| Ex | URETHHALL 4050-55 | BDO (hard segment) | Glycerol (crosslinker) | Syst. Func. | NCO/OH ratio |
| A1 | 0.40 | 0.40 | 0.20 | 2.07 | 1.05 |
| A2 | 0.35 | 0.35 | 0.30 | 2.10 | 1.05 |
| A3 | 0.60 | 0.20 | 0.20 | 2.07 | 1.05 |
| A4 | 0.53 | 0.18 | 0.30 | 2.10 | 1.05 |
| A5 | 0.49 | 0.25 | 0.25 | 2.09 | 1.05 |

The test methods used to evaluate and compare the various samples are described below.

Stress Relaxation was measured according to ASTM D412-06a, wherein the tensile stress at 30% strain decays less than 30% over a period of one hour (i.e., the "Stress Relaxation Test Method"). A 1.3 cm (0.5 inch) wide sample was placed in an INSTRON tensile tester. The sample was strained to 30%, i.e., the strained length of the sample was 30% greater than the initial unstrained length of the sample. The load required to strain the sample by 30% was recorded as the Start Load ("SL"). The normalized start load ("NSL") was calculated by dividing the SL by the original cross sectional area of the sample. The End Load ("EL") was recorded as the load required to maintain a 30% strain after one hour load. The normalized end load ("NEL") was calculated by dividing the EL by the original cross sectional area of the sample. The ratio of the difference between the Start Load and the End Load over the Start Load was multiplied by 100 to calculate the percent change in load reported as the Stress Relaxation (SR) of the sample, i.e.,

SR=100(SL−EL)/SL.

The results are reported in Table 3A.

TABLE 3A

Stress Relaxation results for Data Set A.

| | Example | | | | |
|---|---|---|---|---|---|
| | A1 | A2 | A3 | A4 | A5 |
| Thickness (microns) | 305 | 356 | 178 | 178 | 279 |
| Peak Load (kgf) | 0.355 | 0.443 | 0.114 | 0.192 | 0.343 |
| Start Load "SL" (kgf) | 0.355 | 0.443 | 0.112 | 0.192 | 0.343 |
| Normalized Start Load "NSL" (kPa) | 900 | 960 | 480 | 830 | 950 |
| End Load "EL" (kgf) | 0.274 | 0.368 | 0.054 | 0.144 | 0.281 |
| Normalized End Load "NEL" (kPa) | 690 | 800 | 230 | 620 | 780 |
| Stress Relaxation "SR" | 23% | 17% | 52% | 25% | 18% |
| Modulus (kgf) | 0.391 | 0.315 | 0.222 | 0.381 | 0.406 |

In addition, Tensile/Elongation testing was performed on each sample according to ASTM D412-06a. The samples were 0.635 cm wide "dogbones." The test was performed at a rate of 25.4 cm/minute. The results are reported in Table 3B.

TABLE 3B

Tensile/Elongation results for Data Set A.

| | Example | | | | |
|---|---|---|---|---|---|
| | A1 | A2 | A3 | A4 | A5 |
| Thickness (microns) | 406 | 381 | 152 | 229 | 254 |
| Peak Load (kgf) | 3.30 | 3.85 | 0.59 | 2.13 | 2.40 |
| Peak Stress (MPa) | 12.5 | 15.6 | 6.02 | 14.4 | 14.6 |
| Strain at Break (%) | 595 | 528 | 837 | 553 | 560 |
| Elongation at Break (cm) | 30.2 | 26.8 | 42.4 | 28.2 | 28.4 |

Comparing the results for Examples A1 and A3 to Examples A2 and A4, respectively, the present inventors determined that an increase in the system functionality led to a decrease in the stress relaxation. In addition, comparing the results for Examples A1 and A2 to Examples A3 and A4, respectively, the present inventors determined that a decrease in the mole fraction of equivalents of hard segment relative to the mole fraction of equivalents of the polyester polyol led to a decrease in normalized start and end loads, but an increase in the stress relaxation.

Data Set B. Additional samples of an elastic urethane layer were prepared according to the General Procedure for Preparing a Urethane Layer. Guided by the results obtained with Data Set A, the compositions were based on a ten-point design of experiments where the relative moles of equivalents of the various polyols in the combination of polyols (i.e., (a) the polyester diol, (b) the crosslinker, and (c) the hard segment) were independently varied. The design space was selected such that the NCO/OH ratio was 1.05 and the system functionality was at least 2. The ten-point design is summarized in Table 4A. The compositions used for Data Set B are summarized in Table 4B. In addition to the components listed in Table 4B, 300 ppm DABCO T-12 catalyst was added to each sample.

TABLE 4A

Ten-point design of Data Set B.

| | Mole fraction of equivalents | | |
|---|---|---|---|
| Ex. | URETHHALL 4050-55 | BDO | glycerol |
| B1 | 0.250 | 0.450 | 0.300 |
| B2 | 0.317 | 0.367 | 0.317 |
| B3 | 0.250 | 0.350 | 0.400 |
| B4 | 0.250 | 0.400 | 0.350 |
| B5 | 0.267 | 0.417 | 0.317 |
| B6 | 0.267 | 0.367 | 0.367 |
| B7 | 0.300 | 0.350 | 0.350 |
| B8 | 0.350 | 0.350 | 0.300 |
| B9 | 0.283 | 0.383 | 0.333 |
| B10 | 0.300 | 0.400 | 0.300 |

TABLE 4B

Compositions of the urethane elastic layers of Data Set B.

| | URETHHALL 4050-55 | | BDO | | glycerol | | MONDUR ML | | |
|---|---|---|---|---|---|---|---|---|---|
| Ex. | gm | mMol Eq. | gm | mMol Eq. | Gm | mMol Eq. | gm | mMol Eq. | Syst. Func. |
| B1 | 11.7 | 11.4 | 0.93 | 20.6 | 0.42 | 13.7 | 6.0 | 48 | 2.10 |
| B2 | 14.8 | 14.5 | 0.75 | 16.8 | 0.44 | 14.5 | 6.0 | 48 | 2.11 |
| B3 | 11.7 | 11.4 | 0.72 | 16.0 | 0.56 | 18.3 | 6.0 | 48 | 2.14 |
| B4 | 11.7 | 11.4 | 0.82 | 18.3 | 0.49 | 16.0 | 6.0 | 48 | 2.12 |
| B5 | 12.4 | 12.2 | 0.86 | 19.0 | 0.44 | 14.5 | 6.0 | 48 | 2.11 |
| B6 | 12.4 | 12.2 | 0.75 | 16.8 | 0.51 | 16.8 | 6.0 | 48 | 2.13 |
| B7 | 14.0 | 13.7 | 0.72 | 16.0 | 0.49 | 16.0 | 6.0 | 48 | 2.12 |
| B8 | 16.3 | 16.0 | 0.72 | 16.0 | 0.42 | 13.7 | 6.0 | 48 | 2.10 |
| B9 | 13.2 | 13.0 | 0.79 | 17.5 | 0.47 | 15.2 | 6.0 | 48 | 2.11 |
| B10 | 14.0 | 13.7 | 0.82 | 18.3 | 0.42 | 13.7 | 6.0 | 48 | 2.10 |

Stress Relaxation and Tensile/Elongation tests were performed on each sample, according to the procedures described above. The results are summarized in Tables 5A and 5B.

TABLE 5A

Stress Relaxation results for Data Set B.

| Ex. | Thick. (microns) | SL (kgf) | NSL (kPa) | EL (kgf) | NEL (kPa) | SR (%) | Modulus (kgf) |
|---|---|---|---|---|---|---|---|
| B1 | 178 | 0.644 | 2800 | 0.521 | 2260 | 19 | 0.811 |
| B2 | 102 | 0.163 | 1240 | 0.156 | 1190 | 4 | 0.523 |
| B3 | 152 | 0.286 | 1450 | 0.226 | 1140 | 21 | 0.440 |
| B4 | 203 | 0.322 | 1220 | 0.305 | 1160 | 5 | 0.514 |
| B5 | 160 | 0.345 | 1660 | 0.313 | 1510 | 9 | 0.552 |
| B6 | 102 | 0.150 | 1140 | 0.143 | 1090 | 4 | 0.540 |
| B7 | 102 | 0.150 | 1140 | 0.145 | 1100 | 3 | 0.504 |
| B8 | 127 | 0.163 | 990 | 0.158 | 960 | 3 | 0.464 |
| B9 | 114 | 0.168 | 1130 | 0.166 | 1120 | 1 | 0.768 |
| B10 | 102 | 0.177 | 1340 | 0.154 | 1170 | 13 | 0.550 |

TABLE 5B

Tensile/Elongation results for Data Set B.

| | Thickness | Peak Load | Peak Stress | Strain at break | Stress at stated percent elongation (kg-force) | | | |
|---|---|---|---|---|---|---|---|---|
| Ex. | (microns) | (kgf) | (MPa) | (%) | 30% | 40% | 50% | 60% |
| B1 | 178 | 2.54 | 22.1 | 451 | 0.118 | 0.172 | 0.191 | 0.213 |
| B2 | 102 | 1.22 | 18.6 | 513 | 0.091 | 0.113 | 0.118 | 0.145 |
| B3 | 152 | 1.49 | 15.1 | 365 | 0.113 | 0.118 | 0.150 | 0.159 |
| B4 | 203 | 2.22 | 16.9 | 359 | 0.118 | 0.141 | 0.163 | 0.181 |
| B5 | 160 | 1.80 | 17.3 | 411 | 0.122 | 0.141 | 0.159 | 0.186 |
| B6 | 102 | 0.52 | 7.9 | 390 | 0.086 | 0.091 | 0.122 | 0.118 |
| B7 | 102 | 0.42 | 6.4 | 416 | 0.086 | 0.091 | 0.118 | 0.118 |
| B8 | 127 | 0.62 | 7.6 | 481 | 0.077 | 0.091 | 0.113 | 0.113 |
| B9 | 114 | 0.86 | 11.6 | 432 | 0.104 | 0.104 | 0.136 | 0.141 |
| B10 | 102 | 0.60 | 9.2 | 424 | 0.100 | 0.127 | 0.141 | 0.145 |

A regression analysis was performed on the results obtained from Data Set B. The present inventors discovered a strong correlation between the relative mole fraction of equivalents of the various polyols and the following mechanical properties: Normalized Start Load (NSL), Normalized End Load (NEL), and Stress Relaxation (SR). The following correlations were identified, wherein SLC is the correlated normalized start load (Equation 1 "EQ. 1"), ELC is the correlated normalized end load ("EQ. 2"), and SRC is the correlated stress relaxation ("EQ. 3"). In these following correlations, x is the mole fraction of equivalents of (a) the polyester diol;

y is the mole fraction of equivalents of (b) the crosslinker; and z is the mole fraction of equivalents of (c) the hard segment; wherein the mole fractions are based on the total number of moles of equivalents in the combination of polyols; thus, the sum of x, y, and z is one.

$$SLC = 10{,}203x + 66{,}635y + 109{,}567z - 7632x \cdot y - 194{,}384x \cdot z - 345{,}379y \cdot z, \quad (EQ.\ 1)$$

$$ELC = 4102x + 25{,}628y + 75{,}297z + 44{,}876x \cdot y - 148{,}769x \cdot z - 199{,}804y \cdot z. \quad (EQ.\ 2)$$

$$SRC = -72x + 2378y + 967z - 4062x \cdot y + 247x \cdot z - 6445y \cdot z. \quad (EQ.\ 3)$$

In some embodiments, the relative amounts of the polyols are selected such that mole fraction of equivalents of polyester diol (x) is between 0.25 and 0.6, inclusive, e.g., between 0.25 and 0.35, inclusive. In some embodiments, the mole fraction of equivalents of crosslinker (y) is between 0.15 and 0.4, inclusive, e.g., between 0.3 and 0.4, inclusive. In some embodiments, the mole fraction of equivalents of hard segment (z) is between 0.2 and 0.45, inclusive; e.g., between 0.35 and 0.45, inclusive. For example, in some embodiments, the relative amounts of the polyols will be selected such that mole fraction of equivalents of polyester diol (x) is 0.25 and 0.35, inclusive; the mole fraction of equivalents of crosslinker (y) is between 0.3 and 0.4, inclusive; and the mole fraction of equivalents of hard segment (z) is between 0.35 and 0.45, inclusive.

Relying on these correlations, the properties of the core layer can be selected to provide desired properties by adjusting the relative amounts of the various polyols in the combination of polyols. In some embodiments, the relative mole fraction of equivalents of polyester diol, crosslinker, and hard segment may be selected in an attempt to provide a desired stress relaxation, for example to match the stress relaxation behavior of the material (e.g., fabric) to which it is bonded. For example, in some embodiments, the relative mole fraction of equivalents of polyester diol, crosslinker, and hard segment are selected such that the correlated stress relaxation (SRC) is less than 30, e.g., between 15 and 30, inclusive.

Alternatively, or in addition to controlling the stress relaxation, the relative mole fraction of equivalents of polyester diol, crosslinker, and hard segment may be selected to achieve a desired start load or end load. For example, in some embodiments, it may be desirable to maintain a desired level of end load to provide the appropriate fit and feel of the garment, or to prevent a loose fit. In some embodiments, the relative mole fraction of equivalents of polyester diol, crosslinker, and hard segment are selected to provide a correlated end load (ELC) of between 500 and 2500 kPa, e.g., between 750 and 2000 kPa. In some embodiments, the relative mole fraction of equivalents of polyester diol, crosslinker, and hard segment are selected to provide a correlated start load (SLC) of between 500 and 2500 kPa, e.g., between 750 and 2000 kPa.

A thermoplastic bonding layer was prepared by mixing 9 grams of PRIPLAST 3192 polyol and 1 gram of DESMODUR I (isophorone diisocyanate), with one drop of DABCO T-12 catalyst. This composition was coated following the General Coating Procedure using an approximately 25 micron (1 mil) coating gap on the notch bar coater. Samples were allowed to polymerize overnight and then one of the silicone polyester carrier liners was removed.

The urethane composition of Example A2 was then coated between the two thermoplastic bonding layers following the General Coating Procedure except that the mixed solution was deposited between two thermoplastic adhesive films positioned above and below the coating solution, rather than between to release liners. This structure was allowed to cure for 24 hours at room temperature, forming an elastic thermoset core layer between the two thermoplastic bonding layers.

The resulting exemplary elastic bonding film is illustrated in FIG. 1. Referring to FIG. 1, elastic bonding film 10 includes elastic thermoset layer 20, first thermoplastic bonding layer 31 bonded to first surface 21 of layer 20, and second thermoplastic bonding layer 32 bonded to second surface 22 of layer 20.

Figure 2:
FIG. 2 illustrates an article comprising an exemplary bonding film according to some embodiments of the present disclosure bonded to a substrate.

The elastic bonding film was then cut into 1.3 cm (0.5 inch) wide strips and bonded between two pieces of an elastic fabric supplied by VANITY FAIR using a top and bottom heated platen press at 149° C. (300° F.) and a pressure of 345 kPa pressure for 3 seconds. The resulting article 50 is illustrated in FIG. 2. As shown, first thermoplastic bonding layer 31 is used to bond elastic bonding film 10 to first piece of fabric 41.

Similarly, second thermoplastic bonding layer 32 is used to bond elastic bonding film 10 to second piece of fabric 42.

The bonding force between the thermoplastic bonding layer and the fabric was measured using a T-Peel test according to ASTM D1876-01. The bonding force was 9.3 Newtons (2 pounds force).

The bonded sample was allowed to age for 72 hours at room temperature. The stress relaxation of the bonded sample was measured according to the test method described herein. The stress relaxation after one hour at 30% strain was 27.3%, which represents the approximate value of the fabric itself.

The elastic bonding films of the present disclosure may be used in a wide variety of applications. For example, the elastic bonding films may be used to adhere aesthetic and/or functional layers to fabric. The following non-limiting examples illustrate some representative uses for the elastic binding films.

Figure 3:
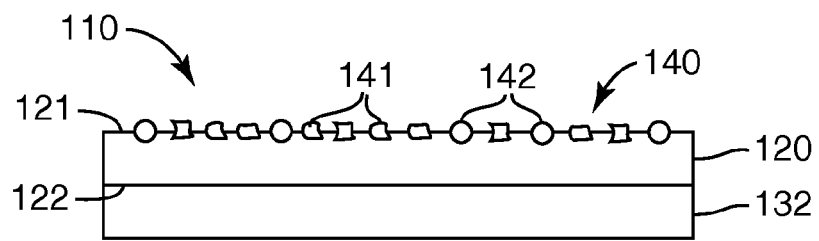
FIG. 3 illustrates an article comprising an exemplary bead-coated bonding film according to some embodiments of the present disclosure.

In some embodiments, the elastic binding films of the present disclosure may be used to create bead-coated bonding films. An exemplary bead-coated bonding film is illustrated in FIG. 3. Bead-coated bonding film 110 includes elastic thermoset layer 120 and thermoplastic bonding layer 132 bonded to second surface 122 of layer 120. Bead layer 140 comprises a plurality of spherical beads 141 and/or irregularly shaped beads 142 located at first surface 121 of elastic thermoset layer 120. At least a portion of the beads are positioned such that a portion each bead is embedded in elastic thermoset layer 120 and a portion of each bead extends above first surface 121 of layer 120. In some embodiments, bead-coated bonding film may be adhered to a substrate (e.g., a fabric) via the thermoplastic bonding layer. The exposed bead layer may then provide aesthetic (e.g., visual or tactile) features and/or functional features to the fabric.

Example C

Bead-Coated Elastic Composite Film

Bead Coat Carrier Preparation. A transfer carrier liner was made by extruding about a 25 micron thick thermoplastic release layer of low density polyethylene resin from Quantum Chemical, designated NA219-000 and having a melt index of about 10, at about 240° C. on a 96 micron thick biaxially oriented support layer of heat stabilized polyethylene terephthalate (PET) film. The transfer carrier was treated with an ultraviolet corona while the polyethylene was molten to adhere the polyethylene to the polyester.

Ordinary soda-lime glass beads obtained primarily from recycled glazing from Flex-O-lite Inc. from their Muscatine Iowa plant were treated via spray drying with about 300 parts per million A-1100 amino functional triethoxy silane from OSi Specialties Inc. The silane was dispersed at about 10 wt. % solids in a 95 wt. %/5 wt. % ethanol/water solution. The beads were dried at about 90° C. for 30 minutes. The treated beads were cascade coated on the transfer carrier at about 105° C. and subsequently heated at about 120° C. for about 1.5 minutes to partially embed the beads.

The size distribution of the treated beads and irregularly shaped glass particles was measured by sieving. The calculated average cross-sectional diameter of the beads was about 58 microns. The irregularly shaped glass particles were approximately equally distributed throughout the bead size population with an average count of about 10% based upon the total count of the beads and the irregulars shaped particles. 95% by weight of the beads and irregulars fell within a threefold cross-sectional diameter range of about 38 microns to about 115 microns. The average count of irregular particles was based on particles having at least one dimension equal to or greater than 38 microns. The larger beads and the agglomerated beads were only loosely held by the liner, such that mild surface abrasion could dislodge them. The beads having diameters below about 100 microns were held sufficiently, so that a subsequent processing operation resulted in less bead loss.

Thermoplastic Adhesive Film Preparation. A thermoplastic polyurethane (ESTANE 58213 obtained from Lubrizol Corporation, Wickliffe, Ohio) was extruded at 50 microns onto a kraft paper release liner using a twin-screw extruder to form a thermoplastic adhesive film.

A two-part elastic polyurethane composition was prepared as follows. Part 1 contained: 26.2 grams polyester polyol (URETHHALL 4050-55D), 0.92 grams crosslinker (glycerol), 1.56 grams hard segment (1,4-Butane diol), and 2 drops DABCO T-12. Part 2 contained 12 grams MDI (MONDUR ML).

The thermoplastic adhesive film was oriented with the adhesive facing up and fed into a notch-bar coating apparatus. The bead coat carrier was like-wise fed into the notch-bar coating apparatus with the beads oriented down towards the thermoplastic adhesive film. The gap under the notch-bar, between the two liners was set at 125 microns.

Part 1 and Part 2 of the two-part elastic polyurethane composition were mixed together for 20 seconds using a FLAK-TEC mixer and subsequently deposited onto the thermoplastic adhesive film of the notch-bar coating apparatus. The top and bottom films were then pulled through the notch bar assembly using a steady pulling motion. The composite film was allowed to cure for approximately 24 hours under room temperature conditions and then placed in a 70° C. oven for 8 additional hours to complete the cure of the two part elastic polyurethane.

The transfer carrier liner of the resulting bead-coated elastic binding film was removed resulting in the smooth transfer of the glass beads onto the surface of the cured and crosslinked elastic polyurethane. The finished composite film was highly elastic and exhibited a silky smooth feel on the surface of the film. This silky smooth feel was surprisingly retained when the film was stretched under tension considering that the inter particle spacing between the beads was being increased.

Example D

A sample of the bead-coated elastic composite film of Example C was cut into a 5 cm (two inch) by 15 cm (six inch) section. The paper release liner protecting the thermoplastic adhesive was removed and the adhesive side of the composite film was placed into direct contact with WHITESTAR nylon/spandex TRICOT #442 elastic fabric from Vanity Fair. This fabric/film laminate was then placed in a heated platen press manufactured by Geo Knight & Co Inc., Brockton Mass. The press was heated to approximately 149° C. on both the top and bottom plates and the press activated at 207 kilopascals of pressure for 10 seconds. The fabric/film laminate was then removed from the press and allowed to cool to room temperature. At this point the bead coat liner was removed from the laminate thereby exposing the bead coat surface. The composite was highly elastic and the tactile feel of the laminate surface was judged to be identical whether in its unstrained state or stretched to greater than 100%. The film laminate bonded to the fabric can serve to alter the tactile nature of the fabric without interfering with the fabrics elastic behavior and also serve as a protective patch to improve the performance and durability of the fabric.

Figure 4:
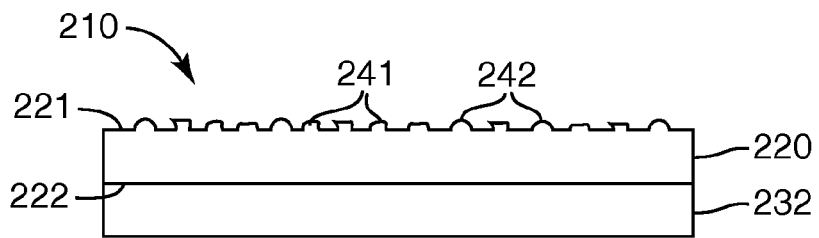
FIG. 4 illustrates an article comprising a textured bonding film according to some embodiments of the present disclosure.

In some embodiments, the elastic bonding films of the present disclosure may textured. An exemplary textured bonding film is illustrated in FIG. 4. Textured bonding film 210 includes elastic thermoset layer 220 and thermoplastic bonding layer 232 bonded to second surface 222 of layer 220. First surface 221 of elastic thermoset layer 220 is textured. In some embodiments, textured first surface 221 comprises semi-spherical features 241 and/or irregular features 242.

Generally, the average height and width of the features are at least 10 microns. In some embodiments, the average height and width of the features are at least 20 microns, or even at least 40 microns. In some embodiments, the average height and width of the features are no greater than 150 microns, in some embodiments, no greater than 100 microns.

In some embodiments, a textured bonding film may be adhered to a substrate (e.g., a fabric) via the thermoplastic bonding layer. The exposed textured surface may then provide aesthetic (e.g., visual or tactile) features and/or functional features to the fabric.

Example E

The bead coat liner of a sample of the bead-coated elastic composite film of Example C was removed revealing pockets in the liner surface corresponding to the locations of the beads. This release liner was then input as the top liner in the notch-bar coating apparatus with the pockets facing down. The thermoplastic adhesive film was oriented with the adhesive facing up and fed into the notch-bar coater. Part 1 and Part 2 of the two-part elastic polyurethane composition were mixed together for 20 seconds using a FLAKTEC mixer and subsequently deposited onto the thermoplastic adhesive film of the notch-bar coating apparatus. The top and bottom films were then pulled through the notch bar assembly using a steady pulling motion. The composite film was allowed to cure for approximately 24 hours under room temperature conditions and then placed in a 70° C. oven for 8 additional hours to complete the cure of the two part elastic polyurethane.

This resulted in an elastic composite film with a substantially identical surface architecture as Example C, absent the glass beads. The beaded surface was reproduced by the elastic urethane core layer resulting in a textured surface with features corresponding to the indented structure of the liner. Surprisingly, the tactile nature of the textured surface was virtually identical to that of the elastic composite film produced in Example C.

Example F

The paper release liner on the thermoplastic adhesive side of the textured elastic bonding film produced in Example E was removed from the film. The film was then bonded to fabric as outlined in Example D. The resulting laminate behaved in a similar fashion to the fabric laminate of Example D, absent the glass beads.

Various modifications and alterations of this invention will become apparent to those skilled in the art without departing from the scope and spirit of this invention.

What is claimed is:

1. An elastic bonding film comprising an elastic, thermoset core layer bonded to at least one thermoplastic bonding layer; wherein the core layer comprises the cured reaction product of a composition comprising (i) a multifunctional isocyanate and (ii) a combination of polyols comprising
   x mole fraction of equivalents of (a) polyester diol, wherein x is between 0.25 and 0.6, inclusive,
   y mole fraction of equivalents of (b) crosslinker, wherein y is between 0.15 and 0.4, inclusive, and
   z mole fraction of equivalents of (c) hard segment; wherein z is between 0.2 and 0.45, inclusive; wherein the sum of x, y, and z is 1;
   wherein, the ratio of isocyanate groups to hydroxyl groups in the combination of polyols is at least 1.05; and
   the hard segment is an alkyl diol containing 2 to 6 carbon atoms.

2. The elastic bonding film of claim 1, wherein the system functionality of the composition is at least 2.05.

3. The elastic bonding film of claim 1, wherein the relative mole fraction of equivalents of polyester diol, crosslinker, and hard segment are selected such that SRC is less than 30, wherein $$SRC = 72x + 2378y + 967z - 4062x \cdot y + 247x \cdot z - 6445y \cdot z.$$

4. The elastic bonding film of claim 3, wherein the mole fraction of equivalents of polyester diol, crosslinker, and hard segment are selected such that SRC is between 15 and 30, inclusive.

5. The elastic bonding film of claim 4, wherein the mole fraction of equivalents of polyester diol, crosslinker, and hard segment are selected such that ELC is between 500 and 2500; wherein $$ELC = 4102x + 25{,}628y + 75{,}297z + 44{,}876x \cdot y - 148{,}769x \cdot z - 199{,}804y \cdot z.$$

6. The elastic bonding film of claim 5, wherein the mole fraction of equivalents of polyester diol, crosslinker, and hard segment are selected such that SLC is between 500 and 2500; wherein $$SLC = 10{,}203x + 66{,}635y + 109{,}567z - 7632x \cdot y - 194{,}384x \cdot z - 345{,}379y \cdot z.$$

7. The elastic bonding film of claim 1, wherein the mole fraction of equivalents of polyester diol, x, is between 0.25 and 0.35, inclusive; the mole fraction of equivalents of crosslinker, y, is between 0.3 and 0.4, inclusive; and the mole fraction of equivalents of hard segment, z, is between 0.35 and 0.45.

8. The elastic bonding film of claim 1, wherein the polyester diol is a five carbon dibasic acid polyester polyol.

9. The elastic bonding film of claim 1, wherein the crosslinker is a glycerol.

10. The elastic bonding film of claim 1, wherein the total functionality of the composition is between 2.1 and 2.15, inclusive.

11. The elastic bonding film of claim 1, wherein the ratio of NCO groups to the OH groups in the composition is between 1.04 and 1.06, inclusive.

12. The elastic bonding film of claim 1, wherein the thermoplastic layer comprises a urethane.

13. The elastic bonding film of claim 1, wherein the thermoplastic layer is a pressure sensitive adhesive.

14. The elastic bonding film of claim 1, wherein the thermoplastic layer is a heat-activated adhesive.

15. The elastic bonding film of claim 1, further comprising a plurality of beads partially embedded in the elastic core layer.

16. The elastic bonding film of claim 1, wherein the elastic core layer comprises a textured surface, wherein the textured surface comprises features having an average height of at least 10 microns and an average width of at least 10 microns.

17. An article comprising a fabric and the elastic bonding film of claim 1, wherein the thermoplastic layer of the elastic bonded film is bonded to the fabric.

18. The article claim 17, wherein the fabric has a stress relaxation, SRF, as measured according to the "Stress Relaxation Test Method" and wherein the mole fraction of equivalents of polyester diol, crosslinker, and hard segment are selected such that SRC is less than 1.2 SRF, wherein $SRC=72x+2378y+967z-4062x \cdot y+247x \cdot z-6445y \cdot z.$

19. The article of claim 18, the mole fraction of equivalents of polyester diol, crosslinker, and hard segment are selected such that SRC is between 0.8 SRF and 1.1 SRF.

* * * * *